July 28, 1953   R. PIRARD   2,646,860
SHOCK ABSORBER, ESPECIALLY FOR AUTOMOTIVE VEHICLES
Filed March 30, 1950

Roger Pirard
INVENTOR.

BY *(signature)*
Attorneys

Patented July 28, 1953

2,646,860

UNITED STATES PATENT OFFICE 2,646,860

SHOCK ABSORBER, ESPECIALLY FOR AUTOMOTIVE VEHICLES

Roger Pirard, La Ferriere-sur-Risle, France, assignor of fifty per cent to James V. Sparks, Austin, Tex.

Application March 30, 1950, Serial No. 152,818
In France April 12, 1949

1 Claim. (Cl. 188—129)

The present invention has for its object to provide a shock absorber especially adapted for use in automotive vehicles.

The shock absorber according to the invention comprises two elements displaceable one within the other and respectively rigid with the chassis and an axle or a part connected with the axle, and in addition an expansible member formed by a plurality of suitably interconnected parts which move apart from each other whenever a shock or rocking movement produces a relative displacement of the said elements, said member coming into contact with one of said elements so as to provide, through friction, the required shock absorbing effect.

In one embodiment, one of the elements is in the form of a cylinder in which the other element can slide, said other element being rigid with a cone and controlling, during the displacement, the expansion of a deformable member of cylindrical form which acts by its periphery upon the external wall of the cylinder element. A return spring abutted at one end on the deformable member and at the other end on the inner element serves to maintain said member on the control cone.

According to another embodiment, the expansible member acts on the inner element.

Two forms of embodiment of shock absorbers according to the invention are described hereinafter merely by way of example. In the description reference is made to the appended drawings in which.

Figure 1:
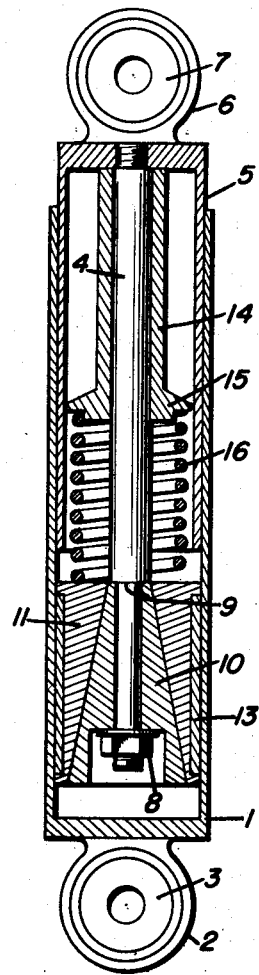
Figure 1 is a longitudinal axial section of a first embodiment.

As shown, one element 1 is constituted in the form of a cylinder and is rigid with a ring 2 in which is provided a block 3 by which one end of the shock absorber may be secured. The other element is constituted by an axial rod 4 mounted on a part 5 which serves to prevent the ingress of dust and gravel and to secure the other end of the shock absorber by the ring 6 and the block 7.

At the free end of the rod 4 which is formed with screw threads, a cone 10, made of steel for instance, is mounted by means of the nut 8 against the shoulder 9.

The expansible member 11 of cylindrical shape is made up in turn of a certain number of elements 12 and is provided over its outer surface with a lining 13 of suitable material.

On the end wall of the part 5 bears a tube 14 terminating in a base flange 15. A spring 16 is seated at one end against the expansible member 11 and at the other end against the flange 15.

When the shock absorber is subjected to traction, the distance between its rings 2 and 6 increasing, the rod 4 is displaced, moving the cone 10 with it. The latter is retained in contact with the expansible member 11 subjected to the action of the spring 16, the cone acts on said member to tend to move its element apart from one another. As a result the outer diameter of the expansible member 11 tends to increase and consequently exerts pressure on the cylinder 1. Therefore, the expansible members will exert, in moving within the cylinder 1, a frictional action which damps the rocking movement or shock which gave rise to its displacement.

Figure 4:
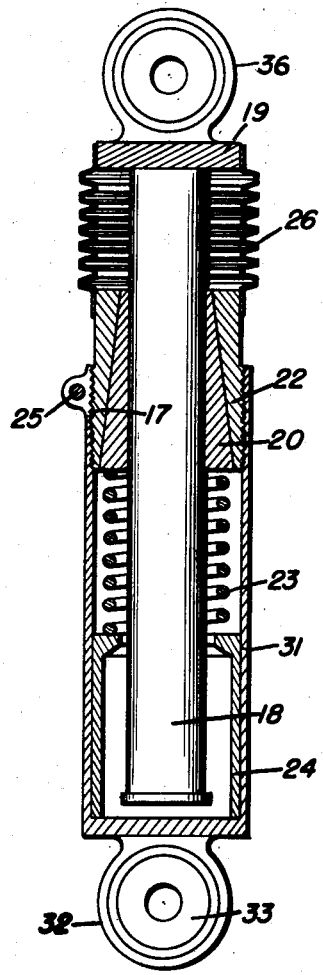
Figure 4 is an axial longitudinal section of a second embodiment.
Figure 2:
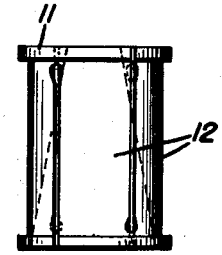
Figures 2 and 3 are respectively views in elevation and plan of the expanding member.
Figure 5:
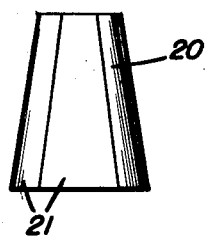
Figure 5 is a detail view in elevation of the expanding member.
Figure 3:
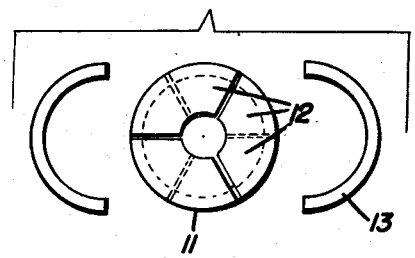

In the modification shown in Figures 4 and 5, the device comprises a cylinder 31 terminating in a ring 32 and a block 33. At its top said cylinder is internally threaded at 17. Within the cylinder is housed a rod 18 terminating in a disc 19 rigid with the other ring 36.

The expansible member 20 of conical shape, is constituted by a number of elements 21 which act in a way similar to that indicated above in connection with the cylindrical expansible member 11. The expansible member 20 acts by friction upon the rod 18. It is retained in contact with the internally conical part 22 by a spring 23 seated at one end on the expansible member 20 and at the other end on a ring 24.

The conical part 22 is screwed on the threads 17 of the cylinder 31 and its height having been adjusted, this part is retained by means of a clamping collar 25.

A bellows 26 made of fabric, rubber or the like, secured on the disc 19 and on the part 22, prevents ingress of dirt into the shock-absorber.

It should be understood that the present invention is not restricted to the foregoing forms of embodiment, but that it may be realized in numerous alternative ways.

Having thus described the invention, what is claimed as new is:

A shock absorber comprising a hollow cylinder having an internally threaded, open upper end, a bushing having an upwardly tapered bore therein threadedly secured to the upper end of said cylinder, a rod extending through said bore into said cylinder, a plurality of wedge-shaped members disposed in said bore and surrounding said rod, a coil spring disposed in said cylinder and surrounding said rod, one end of said coil spring abutting said wedge shaped members and resiliently urging them into said bore, a ring disposed within said cylinder, the lower end of said rod extending through said ring and being enlarged to retain the ring thereon, the other end of said spring abutting said ring.

ROGER PIRARD.

References Cited in the file of this patent

UNITED STATES PATENTS

| Number | Name | Date |
|---|---|---|
| 1,608,392 | Hannah | Nov. 23, 1926 |
| 2,237,318 | Snyder | Apr. 8, 1941 |
| 2,237,319 | Snyder | Apr. 8, 1941 |
| 2,404,666 | Snyder | July 23, 1946 |
| 2,429,140 | Snyder | Oct. 14, 1947 |

FOREIGN PATENTS

| Number | Country | Date |
|---|---|---|
| 734,266 | France | Oct. 19, 1932 |